Feb. 2, 1926. 1,571,299
W. P. PITT
LOOSE LEAF BINDER AND METHOD OF MAKING PARTS OF SAME
Filed June 2, 1921 2 Sheets-Sheet 1
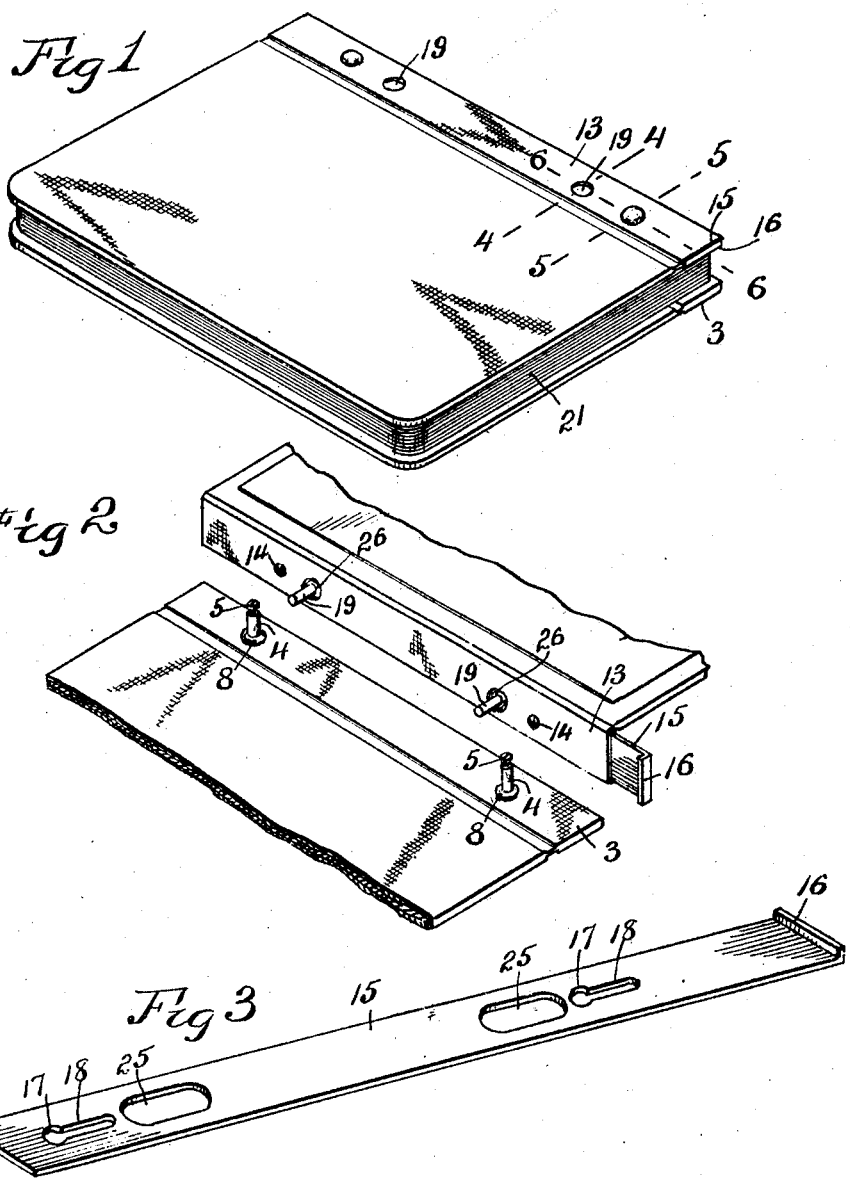
Witness:
R. E. Hamilton
Inventor,
William P. Pitt
By Warren D. House,
His Attorney.

Feb. 2, 1926. 1,571,299
W. P. PITT
LOOSE LEAF BINDER AND METHOD OF MAKING PARTS OF SAME
Filed June 2, 1921   2 Sheets-Sheet 2
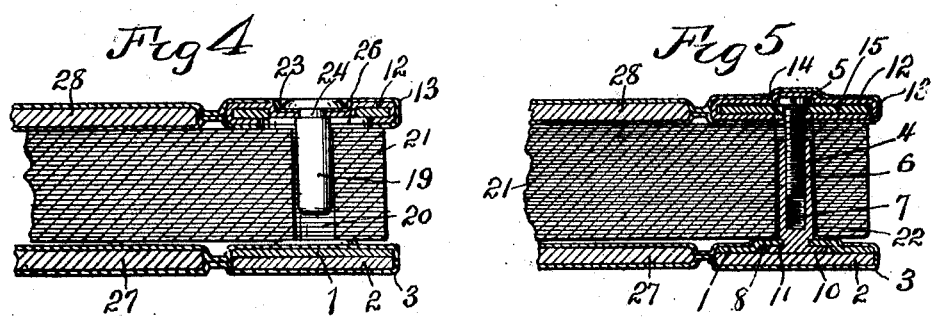
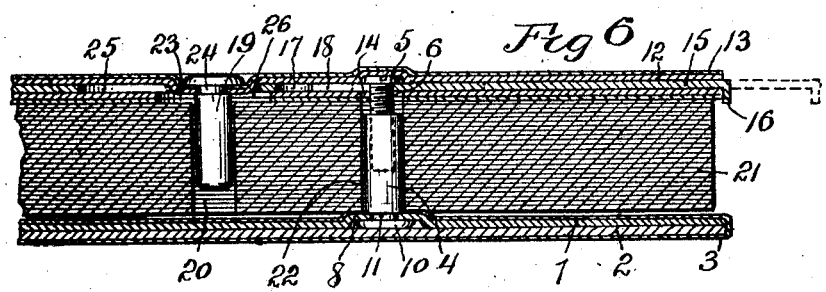
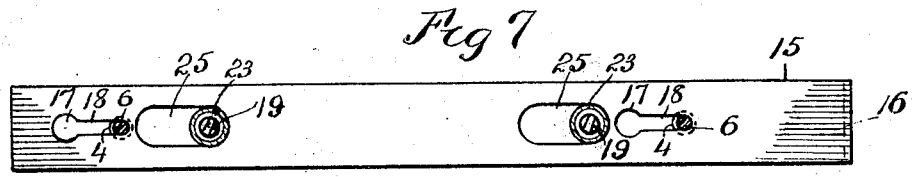
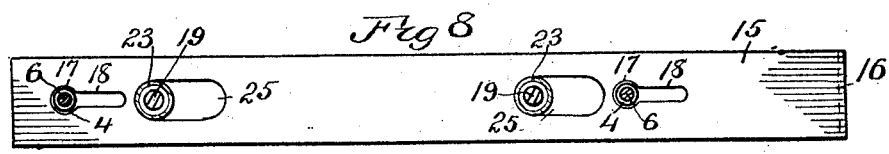
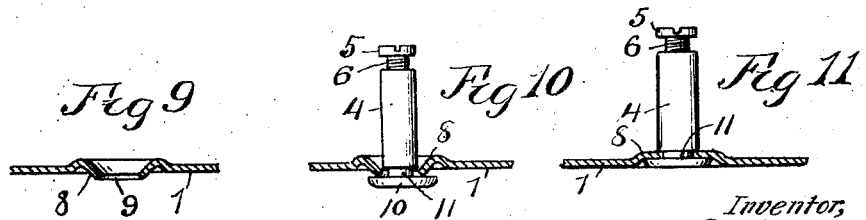
Witness:
R. E. Hamilton
Inventor,
William P. Pitt
By Warren D. House,
His Attorney.

Patented Feb. 2, 1926.

1,571,299

UNITED STATES PATENT OFFICE.

WILLIAM P. PITT, OF KANSAS CITY, MISSOURI, ASSIGNOR TO IRVING-PITT MANUFACTURING COMPANY, OF KANSAS CITY, MISSOURI, A CORPORATION OF MISSOURI.

LOOSE-LEAF BINDER AND METHOD OF MAKING PARTS OF SAME.

Application filed June 2, 1921. Serial No. 474,426.

*To all whom it may concern:*

Be it known that I, WILLIAM P. PITT, a citizen of the United States, residing at Kansas City, in the county of Jackson and State of Missouri, have invented a certain new and useful Improvement in a Loose-Leaf Binder and Method of Making Parts of Same, of which the following is a specification.

My invention relates to improvements in loose leaf binders and method of making parts of same.

The object of my invention is to provide a novel loose leaf binder, which is simple, cheap to make, which is readily adjustable to different leaf-holding capacities, which is strong and durable and is not liable to get out of order, which is easily operated for the insertion or removal of leaves, and which has no exteriorly extending posts.

My invention provides further a novel leaf-supporting post of a leaf-clamping member, and novel means for releasably locking another leaf-clamping member to the post.

A further object of my invention is to provide novel and efficient means for quickly and securely rigidly attaching a leaf-supporting post to a plate of a leaf-clamping member.

The novel features of my invention are hereinafter fully described and claimed.

In the accompanying drawings, which illustrate the preferred embodiment of my invention, Fig. 1 is a perspective view of my improved loose leaf binder, shown in the leaf-clamping position.

Fig. 2 is a perspective view of the two leaf-clamping members, shown detached from each other, and parts connected therewith.

Fig. 3 is an enlarged perspective view of the slidable locking plate.

Fig. 4 is an enlarged vertical sectional view on the line 4—4 of Fig. 1.

Fig. 5 is a vertical sectional view on the line 5—5 of Fig. 1.

Fig. 6 is a vertical sectional view on the line 6—6 of Fig. 1.

Fig. 7 is a top view of the slidable locking plate and the leaf-supporting posts, the latter and portions of the upper clamping member being shown in cross section, the slidable plate being shown in the locking position with relation to the screws of two of the posts.

Fig. 8 is a view similar to Fig. 7, the slidable plate being shown in the unlocked position.

Fig. 9 is a vertical sectional view through one of the bosses of one of the leaf-clamping plates prior to the setting down or flattening of the boss.

Fig. 10 is a view of what is shown in Fig. 9, together with one of the posts as mounted therein prior to the setting down operation.

Fig. 11 is a view similar to Fig. 10, showing the boss set down.

Similar reference characters designate similar parts in the different views.

1 designates a leaf-clamping member comprising a flat metal plate, which may be mounted on a cardboard filling 2 and which may be covered with canvas 3.

One or more leaf-supporting posts 4, are rigidly attached at their lower ends to the plate 1. The upper end of each post 4 has mounted on it a longitudinally adjustable member comprising a screw having a head 5 and provided with a screw-threaded shank 6 which is fitted and adapted for longitudinal adjustment in a vertical screw-threaded hole 7, Fig. 5, in the post 4.

For securing the posts 4 to the plate 1, the latter is provided in its course of manufacture with flaring bosses 8, Fig. 9, corresponding in number to the posts 4 to be employed and having each a vertical hole 9, adapted to have extended through it a post 4, having at its lower end a head 10, and having adjacent to said head a peripheral groove 11, as shown in Fig. 10.

After the post 4 has been mounted in the boss 8, the latter is flattened or set down, as shown in Fig. 11, thereby forcing the boss 8 into the groove 11. The latter is of substantially the same width as the thickness of the plate 1, whereby the post is rigidly held in position. The head 10 having the same thickness as the plate 1 is flush therewith on its lower side, as shown.

The other leaf-clamping member comprises a flat tubular metal member 12, Fig. 5, which is rectangular in cross section and which may be covered by canvas 13. The under side of the member 12 is provided with holes 14 adapted to receive therethrough respectively the screw heads 5, Figs. 5 and 6, Longitudinally slidable in the member 12 is a locking plate 15, which projects outside at one end of the member 12 and which at its projecting end is provided with a flange 16, which serves as a finger hold, by which the locking plate is pulled outwardly, as shown in Fig. 8, and in dotted lines in Fig. 6, to the unlocked position.

The plate 15 is provided with slots, each of which has a portion 17, adapted to receive therethrough the head 5 of the adjacent screw. The remainder of the slot is provided with a contracted portion 18, adapted to receive therein the shank 6 of the adjacent screw and having a width less than the diameter of the screw head 5.

The member 12 has preferably secured to it the upper ends of a plurality of posts 19, which extend downwardly toward the lower clamping member and are adapted to enter holes 20, provided in loose leaves 21, which are also provided with holes 22 adapted to receive posts 4 and the screws mounted therein.

The posts 19 may be secured to the member 12 in the same manner as posts 4 are secured to the plate 1, that is the upper side of the member 12 may be provided with bosses 23, which are flattened into peripheral grooves 24 in the upper ends respectively of the posts 19. The latter extend through slots 25 provided in the plate 15.

The lower side of the member 12 is provided with holes 26 through which extend the posts 19.

The canvas coverings 3 and 13, may be extended to respectively cover card boards 27 and 28, which covered card boards serve as covers for the binder, the coverings 3 and 13 forming the hinges, in the usual manner between the covers and the clamping members.

In the operation of my invention, when it is desired to insert or remove a leaf, the plate 15 is pulled outwardly to the open position shown in Fig. 8, and in dotted lines in Fig. 6. The enlarged portions 17 of the slots will then aline with the screw heads 5. The member 12 may then be detached and leaves may be inserted or removed.

The member 12 is then replaced with the screw heads 5 disposed above the plate 15, as shown in Figs. 5 and 6, after which the plate 15 is forced into the locked position shown in Fig. 5 and in solid lines in Fig. 6, in which position the shanks of the screws 6 will be in the slot portions 18. The screw heads 5 will thus be lockingly engaged with the locking plate 15.

The screws 5 may be vertically adjusted to correspond with the number of leaves to be mounted in the binder.

I do not limit my invention to the structure shown and described, as modifications, within the scope of the appended claims may be made without departing from the spirit of my invention.

What I claim is—

1. In a loose leaf binder of the kind described, a leaf-clamping member, a leaf-supporting post fastened at one end thereto and having in the other end a threaded hole, a screw fitted in said hole and having a head, a tubular leaf-clamping member, a leaf-supporting post fastened thereto, and a locking plate slidable in and projecting from one end of said tubular member to afford a finger hold, and having a slot, a portion of which is adapted to receive therethrough said head, the remainder of the slot being narrower than said head and adapted to receive the shank of the screw.

2. In a loose leaf binder, of the kind described, a tubular leaf-clamping member, a locking plate slidable therein having means adapted to engage a leaf-supporting post, said clamping member having in one side two holes, one of which is adapted to receive said post, and a leaf-supporting post fastened to the other side of said clamping member and extending through the other of said two holes.

3. The method of attaching a leaf-supporting post to a leaf-clamping plate, consisting in forming in the plate a flaring boss having a hole therethrough, then inserting through the hole a leaf-supporting post having at one end a head and next to the head having a peripheral groove, the width of the groove being substantially the same thickness as the plate, and then flattening said boss so as to cause it to be forced into said groove, and forming in the plate a recess of a depth substantially equal to the thickness of said head with the latter substantially flush with the adjacent side of the clamping plate.

In testimony whereof I have signed my name to this specification.

WILLIAM P. PITT.